(12) United States Patent
Kasajima et al.

(10) Patent No.: US 7,184,245 B2
(45) Date of Patent: Feb. 27, 2007

(54) HEAD SLIDER TO BE ADHERED TO PRECISE POSITIONING ACTUATOR, HEAD GIMBAL ASSEMBLY WITH THE HEAD SLIDER, METHOD FOR ADHERING THE HEAD SLIDER TO THE ACTUATOR, MANUFACTURING METHOD OF HEAD SLIDER AND MANUFACTURING METHOD OF HEAD GIMBAL ASSEMBLY

(75) Inventors: Tamon Kasajima, Hong Kong (HK); Masashi Shiraishi, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 28 days.

(21) Appl. No.: 10/173,851

(22) Filed: Jun. 19, 2002

(65) Prior Publication Data
US 2003/0005574 A1 Jan. 9, 2003

(30) Foreign Application Priority Data
Jul. 9, 2001 (JP) .............................. 2001-207988

(51) Int. Cl.
*G11B 5/56* (2006.01)
(52) U.S. Cl. ................................. 360/294.4
(58) Field of Classification Search ............ 360/294.4, 360/234.6, 235.1, 235.2, 294.5, 97.01, 245.4, 360/244.7, 246.6, 234.5; 29/603.06; 338/307
See application file for complete search history.

(56) References Cited

U.S. PATENT DOCUMENTS

| 5,243,482 | A  | * | 9/1993 | Yamaguchi et al. | ..... 360/245.4 |
|---|---|---|---|---|---|
| 5,390,059 | A  | * | 2/1995 | Tokuyama et al. | ........ 360/246.6 |
| 6,246,538 | B1 | * | 6/2001 | Kasamatsu et al. | ...... 360/97.01 |
| 6,320,730 | B1 | * | 11/2001 | Stefansky et al. | ........ 360/294.4 |
| 6,330,131 | B1 | * | 12/2001 | Nepela et al. | ........... 360/234.5 |
| 6,341,415 | B2 | * | 1/2002 | Amemiya et al. | ....... 29/603.06 |
| 6,362,939 | B1 | * | 3/2002 | Crane et al. | ............. 360/294.5 |
| 6,545,846 | B1 | * | 4/2003 | Chee et al. | ............... 360/294.4 |
| 6,801,118 | B1 | * | 10/2004 | Ikemoto et al. | .............. 338/307 |
| 2003/0147177 | A1 | * | 8/2003 | Yao et al. | ................. 360/244.7 |
| 2003/0147181 | A1 | * | 8/2003 | Shiraishi et al. | ......... 360/294.4 |

OTHER PUBLICATIONS

Web Report from www.dict.die.net.*

* cited by examiner

*Primary Examiner*—Tianjie Chen
(74) *Attorney, Agent, or Firm*—Armstrong, Kratz, Quintos, Hanson & Brooks, LLP (57) ABSTRACT

A head slider provided with at least one head element, to be fixed to an actuator for precisely positioning the at least one head element, including adhering sections to be adhered to the actuator, and recesses for receiving an adhesive. At least one of the recesses is positioned at each of the adhering sections.

20 Claims, 10 Drawing Sheets

HEAD SLIDER TO BE ADHERED TO PRECISE POSITIONING ACTUATOR, HEAD GIMBAL ASSEMBLY WITH THE HEAD SLIDER, METHOD FOR ADHERING THE HEAD SLIDER TO THE ACTUATOR, MANUFACTURING METHOD OF HEAD SLIDER AND MANUFACTURING METHOD OF HEAD GIMBAL ASSEMBLY

FIELD OF THE INVENTION

The present invention relates to a head slider to be adhered to a precise positioning actuator for a head element such as a thin-film magnetic head element or an optical head element, to a head gimbal assembly (HGA) with the head slider, to a method for adhering the head slider to the actuator, to a manufacturing method of a head slider and to a manufacturing method of an HGA.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never achieved a satisfactory level of accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there is a piggy-back structure actuator. This piggy-back structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator. On the suspension, stepwise stacked are the actuator and the magnetic head slider, namely, the actuator is caught between the suspension and the slider to form a stacked cantilever structure.

However, such a piggy-back structure actuator had following various problems:

(1) Because of the stepwise stacked structure, a total thickness of the HGA around the magnetic head slider increases by the thickness of the actuator;

(2) Because the actuator as a whole consists of piezoelectric material such as PZT of a brittle material, shock resistance is very poor. Particularly, because the actuator and the magnetic head slider are stacked to form a cantilever structure, a shock easily occurs and also shock resistance is extremely poor;

(3) Depending upon the size of the magnetic head slider, a travel of the magnetic head element during the precise positioning operation varies. Thus, it is difficult to obtain sufficient stroke;

(4) Because of three-dimensional and complicated attachment structure, the handling at the time of an assembly of the HGA is extremely difficult and it is impossible to use a conventional HGA assembly equipment causing productivity to be very worse; and (5) In order not to interfere with the movement of the actuator, it is necessary to assemble with keeping a gap between the actuator and the magnetic head slider and also between the actuator and the suspension. However, forming of such gaps will further decrease the shock resistance and it is difficult to precisely keep the gaps constant. Particularly, since it is difficult to keep the suspension, the actuator and the magnetic head slider in parallel precisely, the head characteristics deteriorates.

To solve the aforementioned various problems, the inventors of this application had proposed an actuator provided with a pair of movable arms for fixing and catching a head slider in a space between the movable arms (U.S. patent Ser. No. 09/933,774 now pending), and an actuator having the same structure but its main section including movable arms being formed by a metal plate (U.S. patent Ser. No. 09/972,939 now pending).

However, in these actuators with the structure for catching side surfaces of the head slider in the movable arms, if a space between the movable arms is forcibly widened when adhering the head slider to the actuator, piezoelectric elements formed on the movable arms or at the base of the movable arms may be damaged. Therefore, it is necessary to fabricate an actuator with a sufficiently larger space between its movable arms than a width or a distance between the side surfaces of the head slider so that an adhesive can be easily entered between the side surfaces of the head slider and the movable arms of the actuator.

However, if the actuator is fabricated to have a sufficiently larger space between the movable arms than the width of the head slider, following various problems may occur:

(A) A layer of the adhesive may become too thick causing deterioration in a resonance characteristics and decrease in stroke;

(B) Because the adhesive may be restricted to the middle of the adhering surface, the adhesive strength will be reduced, a resonance frequency will be lowered and the stroke will be reduced;

(C) In case an adhesive with a high viscosity is used, the adhesive will not be sufficiently entered between side surfaces of the head slider and movable arms of the actuator and therefore a sufficient adhering strength cannot be obtained;

(D) It is very difficult to ensure that both spaces between side surfaces of the head slider and movable arms of the actuator become equal to each other;

(E) Because the actuator and the head slider are assembled after an adhesive is coated, the adhesive may squeeze out and deposit to an air bearing surface (ABS) of the head slider and the movable arms of the actuator, for example, during assembly, thereby causing the control of an amount of the adhesive used to become difficult; and (F) Due to the aforementioned problems (A) to (E), variations in adhering strength, in resonance frequency and in stroke characteristics during mass production may occur.

SUMMARY OF THE INVENTION

It is therefore an object of the present invention to provide a head slider to be adhered to a precise positioning actuator, an HGA with the head slider, a method for adhering the head slider to the actuator, a manufacturing method of a head slider and a manufacturing method of an HGA, whereby adhering between the actuator and a head slider can be easily achieved.

Another object of the present invention is to provide a head slider to be adhered to a precise positioning actuator, an HGA with the head slider, a method for adhering the head slider to the actuator, a manufacturing method of a head slider and a manufacturing method of an HGA, whereby variations and also deteriorations in adhering strength, in resonance frequency and in stroke characteristics can be decreased.

According to the present invention, a head slider provided with at least one head element, to be fixed to an actuator for precisely positioning the at least one head element, includes adhering sections to be adhered to the actuator, and recesses for receiving an adhesive. At least one of the recesses is positioned at each of the adhering sections.

Because the head slider has the recesses for receiving an adhesive, formed at the adhering sections with the actuator, the adhesives will be entered to the adhering sections with reliability and therefore a stable and sufficient adhering strength can be obtained. Also, as the adhesive will not squeeze out, an amount of the adhesive used can be precisely controlled resulting in variations in adhering strength, in resonance frequency and in stroke characteristics at the mass production can be prevented from occurring. Furthermore, because a space between the adhering sections of the actuator for catching the head slider can be determined to a small value equal to or slightly greater than the width of the slider, there exists no thick layer of the adhesive and it is possible to minimize a difference between the right and left gaps at the adhering parts. Therefore, resonance characteristics and stroke characteristics can be prevented from being deteriorated. In addition, because it is possible to apply an adhesive after assembling the head slider with the actuator, the adhering process becomes very easy.

It is preferred that the at least one recess consists of at least one groove.

It is also preferred that the head slider includes an air bearing surfaces (ABS) and two side surfaces caught and supported by the actuator, and that the at least one groove is formed on each of the two side surfaces along the ABS.

It is further preferred that the at least one groove is a groove formed at an edge between each of the two side surfaces and the ABS. Preferably, the groove is formed along a entire length of the edge.

Also, it is preferred that the at least one head element is at least one thin-film magnetic head element.

According to the present invention, also, an HGA includes a head slider provided with at least one head element, a support member and a precise positioning actuator fixed to the head slider and to the support member for precisely positioning the at least one head element. The head slider includes adhering sections adhered to the actuator, and grooves for receiving an adhesive. At least one of the grooves is positioned at each of the adhering sections.

Because the head slider has at least one groove for receiving an adhesive, at the adhering section with the actuator, the adhesives will be entered to the adhering section with reliability and therefore a stable and sufficient adhering strength can be obtained. Also, because the adhesive will not squeeze out, an amount of the adhesive used can be precisely controlled resulting that variations in adhering strength, in resonance frequency and in stroke characteristics at the mass production can be prevented from occurring. Furthermore, because a space between the adhering sections of the actuator for catching the head slider can be determined to a small value equal to or slightly larger than the width of the slider, there exists no thick layer of the adhesive and it is possible to minimize a difference between the right and left gaps at the adhering parts. Therefore, a resonance characteristics and a stroke characteristics can be prevented from being deteriorated. In addition, because it is possible to apply an adhesive after assembling the head slider with the actuator, the adhering process becomes very easy.

It is preferred that the head slider includes an ABS and two side surfaces caught and supported by the actuator, and that the at least one groove is formed on each of the two side surfaces along the ABS.

It is also preferred that the at least one groove is a groove formed at an edge between each of the two side surfaces and the ABS. Preferably, the groove is formed along an entire length of the edge.

Further, it is preferred that the at least one head element is at least one thin-film magnetic head element.

It is preferred that the actuator includes a pair of movable arms, and that the head slider includes two side surfaces caught and supported by the pair of movable arms of the actuator.

It is also preferred that a space between the pair of movable arms of the actuator is substantially equal to or slightly greater than a distance between the two side surfaces of the head slider.

It is further preferred that the actuator further includes a base section, the pair of movable arms extending forward from the base section, and that top end sections of the pair of movable arms are capable of displacing in response to a drive signal applied to the actuator along an ABS of the head slider.

It is preferred that the pair of movable arms and the base section of the actuator are made of an elastic sintered ceramic or a metal plate member.

It is also preferred that each of the pair of movable arms includes an arm member, and a piezoelectric element formed or adhered on a side surface of the arm member.

According to the present invention, further, a method for adhering a head slider provided with at least one head element to an actuator for precisely positioning the at least one head element includes a step of catching side surfaces of the head slider between a pair of movable arms of the actuator, and a step of providing an adhesive into a plurality of grooves. At least one of the plurality of grooves is formed on each of the side surfaces of the head slider so as to adhere the side surfaces to the movable arms, respectively.

After assembling the head slider with the actuator, an adhesive is entered in at least one groove formed on the side surface of the head slider. Because an adhesive is applied after assembling the head slider with the actuator, the adhering process becomes very easy. Also, because the adhesive is entered to the adhering section with reliability, a stable and sufficient adhering strength can be obtained. Furthermore, as the adhesive will not squeeze out, an amount of the adhesive used can be precisely controlled resulting that variations in adhering strength, in resonance frequency and in stroke characteristics can be prevented during mass production. Furthermore, because an adhesive can be applied into the grooves, a space between the adhering sections of the actuator for catching the head slider can be determined to a small value equal to or slightly greater than the width of the slider. Thus, there exists no thick layer of the adhesive and it is possible to minimize a difference between the right and left gaps at the adhering parts.

Therefore, resonance characteristics and stroke characteristics can be prevented from being deteriorated.

It is preferred that the at least one groove is formed on each of the side surfaces along an ABS of the head slider.

Also, it is preferred that the at least one groove is a groove formed at an edge between each of the side surfaces and an ABS of the head slider.

According to the present invention, still further, a manufacturing method of a head slider includes a step of preparing a bar provided with a plurality of head sliders continuously aligned with each other, each of the head sliders being provided with at least one head element, a step of forming blind grooves between the aligned head sliders of the bar, and a step of dicing the bar at a center of each blind groove by a cutting blade provided with a width narrower than a width of the blind groove to separate the bar into individual head sliders.

The groove for receiving an adhesive can be made only by forming the blind groove on the bar. Thus, it is not necessary to change a bar jig for dicing the bar to a new one for making the grooves. Therefore, the conventional manufacturing process can be substantially used, and the manufacturing process of the magnetic head slider can be prevented from complicating.

It is preferred that the forming step includes a step of forming the blind grooves from a surface of the bar corresponding to an ABS of the head sliders.

Furthermore, according to the present invention, a manufacturing method of an HGA includes a step of forming a head slider provided with at least one head element, side surfaces and a plurality of grooves for receiving an adhesive, at least one of the grooves being located on each of the side surfaces, a step of forming an actuator for precisely positioning the at least one head element, the actuator being provided with a base section and a pair of movable arms extending from the base section, the pair of movable arms being capable of displacing in response to a drive signal applied to the actuator, a step of catching side surfaces of the head slider between the pair of movable arms of the actuator, a step of providing an adhesive into the plurality of grooves so as to adhere the side surfaces to the movable arms, respectively, and a step of fixing the base section of the actuator to a support member.

After assembling the head slider with the actuator, an adhesive is entered in at least one groove formed on the side surface of the head slider. Because an adhesive is applied after assembling the head slider with the actuator, the adhering process becomes very easy. Also, because the adhesive is entered to the adhering section with reliability, a stable and sufficient adhering strength can be obtained. Furthermore, as the adhesive will not squeeze out, an amount of the adhesive used can be precisely controlled resulting that variations in adhering strength, in resonance frequency and in stroke characteristics can be prevented during mass production Furthermore, because an adhesive can be applied into the grooves, a space between the adhering sections of the actuator for catching the head slider can be determined to a small value equal to or slightly greater than the width of the slider. Thus, there exists no thick layer of the adhesive and it is possible to minimize a difference between the right and left gaps at the adhering parts. Therefore, resonance characteristics and stroke characteristics can be prevented from being deteriorated.

It is preferred that the at least one groove is formed on each of the side surfaces along an ABS of the head slider.

It is also preferred that the at least one groove is a groove formed at an edge between each of the side surfaces and an ABS of the head slider. Preferably, the groove is formed along an entire length of the edge.

It is further preferred that a space between the pair of movable arms of the actuator is substantially equal to or slightly greater than a distance between the side surfaces of the head slider.

Further objects and advantages of the present invention will be apparent from the following description of the preferred embodiments of the invention as illustrated in the accompanying drawings.

DESCRIPTION OF THE PREFERRED EMBODIMENTS

Figure 1:
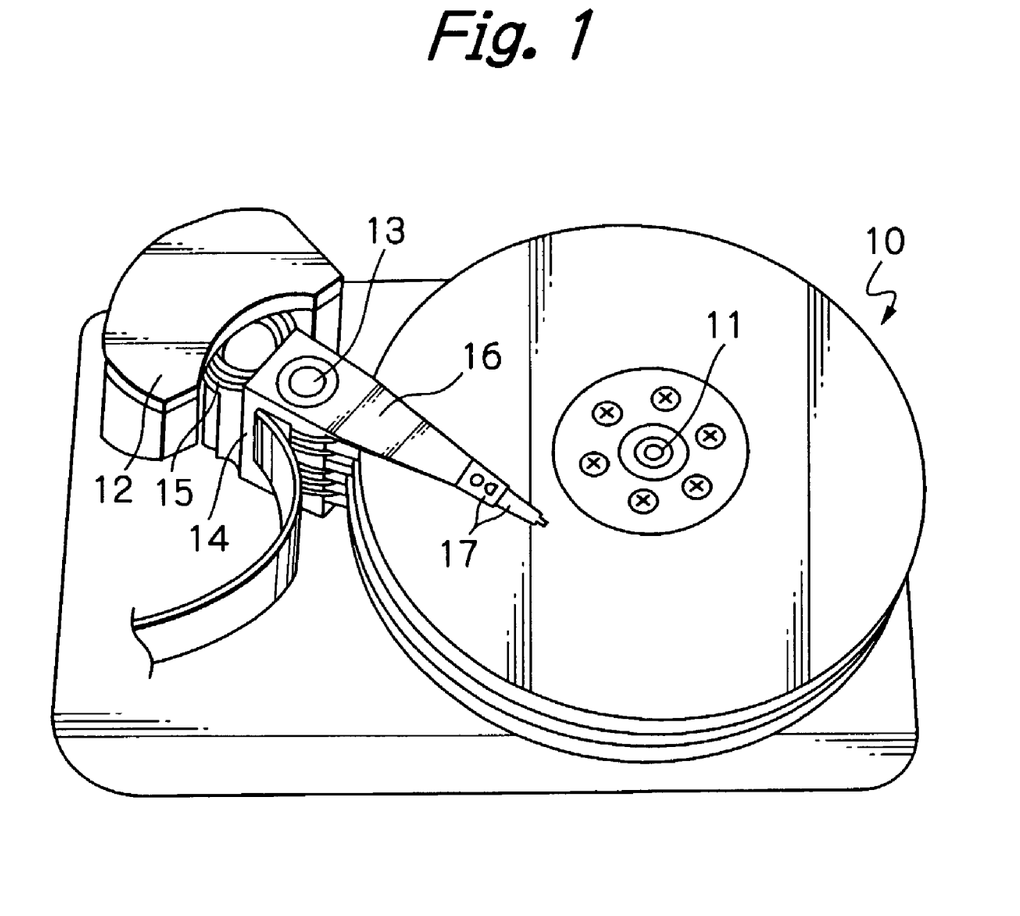
FIG. 1 is an oblique view schematically illustrating main components of a magnetic disk drive apparatus in a preferred embodiment according to the present invention.
Figure 2:
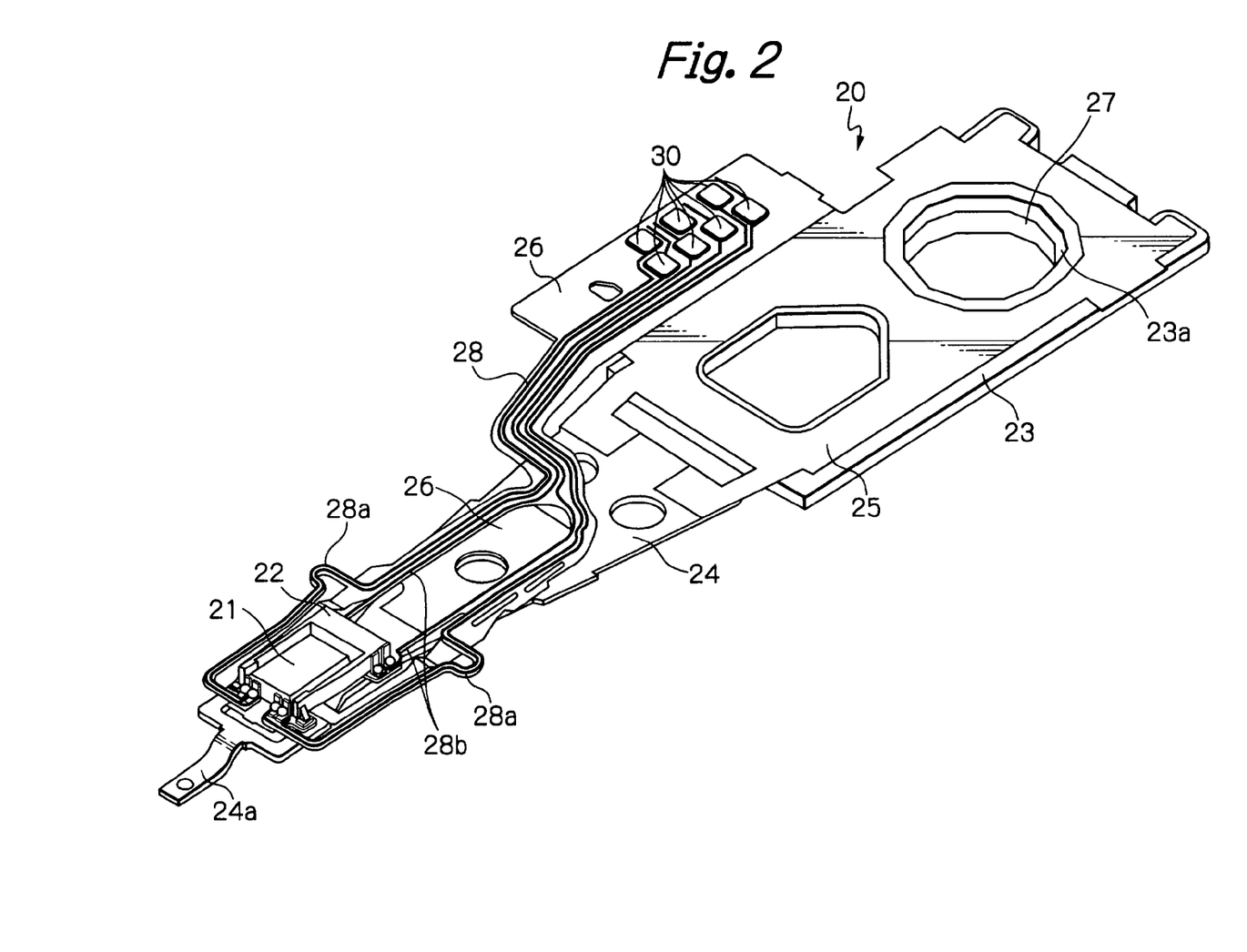
FIG. 2 is an oblique view illustrating the entire structure of an HGA in the embodiment of FIG. 1.
Figure 3:
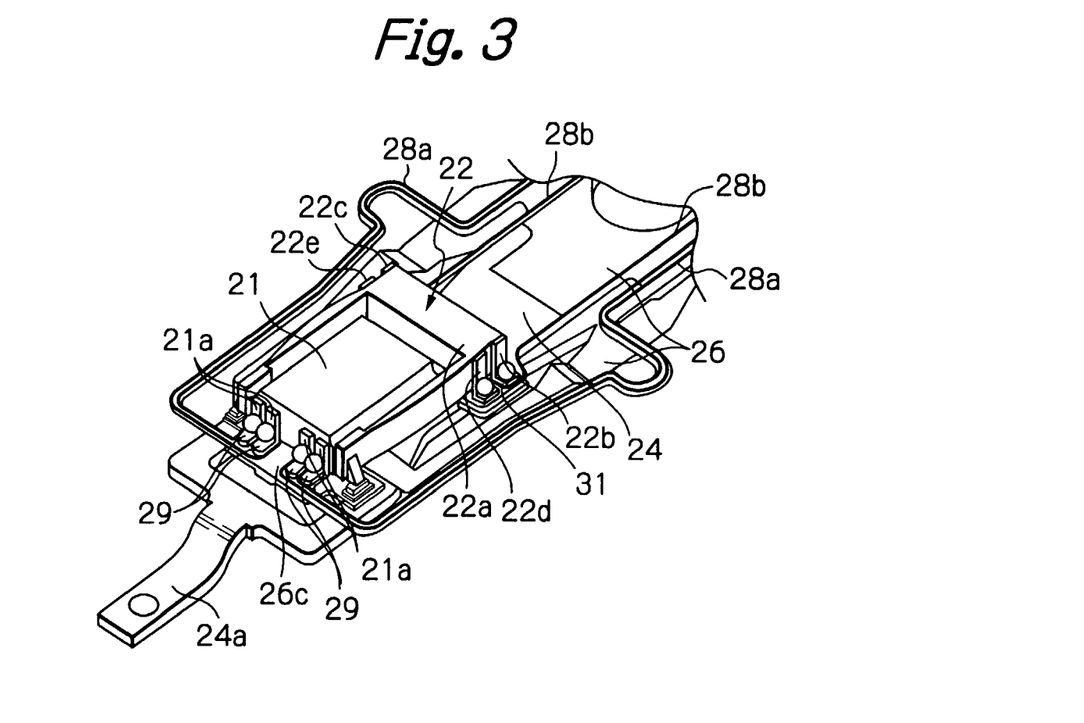
FIG. 3 is an oblique view illustrating a top end section of the HGA in the embodiment of FIG. 1.
Figure 4:
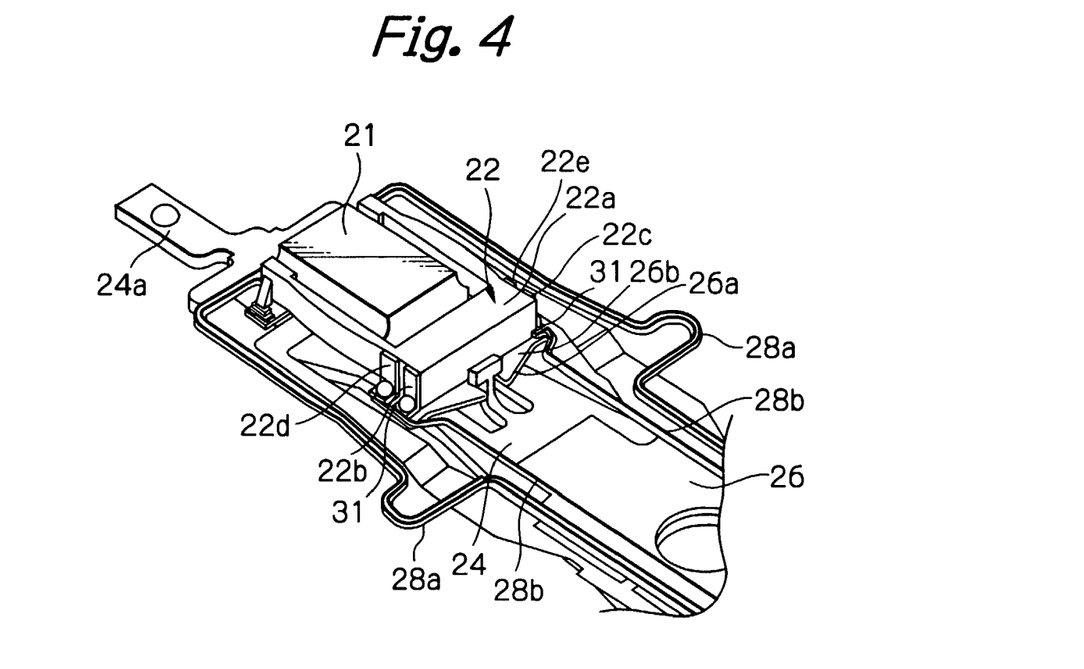
FIG. 4 is an oblique view illustrating a top end section of the HGA in the embodiment of FIG. 1, seen from a different direction from FIG. 3.

FIG. 1 illustrates main components of a magnetic disk unit of a preferred embodiment according to the present invention, FIG. 2 illustrates the entire structure of an HGA in this embodiment, and FIGS. 3 and 4 illustrate a top end section of the HGA in this embodiment, seen from different directions with each other.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and a main actuator 15 such as for example a voice coil motor (VCM) for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has a slider mounted at its top end section so that the slider opposes one surface (recording and reproducing surface) of each of the magnetic disks 10.

As shown in FIGS. 2 to 4, the HGA is assembled by fixing a fine tracking actuator 22 for precise positioning of a thin-film magnetic head element to a top end section of a suspension 20. Side surfaces of a magnetic head slider 21 provided with a thin-film magnetic head element 21g (FIGS. 8, 10, 12 and 13) are caught in a space between movable arms of the actuator 22.

A main or course actuator of VCM 15 shown in FIG. 1 is used for rotationally moving the drive arm 16 to which such HGA is attached, so as to move the entire assembly. The actuator 22 contributes the fine positioning of the HGA, which cannot be adjusted by the main or course actuator 15.

The suspension 20 is substantially formed, as shown in FIGS. 2 to 4, by first and second load beams 23 and 24, a resilient hinge 25 coupled with both these first and second load beams 23 and 24, a resilient flexure 26 fixed on the second load beam 24 and the hinge 25, and a circular base plate 27 formed at an attaching section 23a of the first load beam 23.

The flexure 26 has a flexible tongue 26a depressed by a dimple (not shown) formed on the second load beam 24 at its one end section. On the tongue 26a, fixed is a base section 22a of the actuator 22 via an insulation layer 26b made of, for example, polyimide.

The flexure 26 has elasticity for flexibly supporting the magnetic head slider 21 through the actuator 22 by this tongue 26a. The flexure 26 is made of, in this embodiment, a stainless steel plate (for example SUS304TA) with a thickness of about 20 µm. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of, in this embodiment, a stainless steel plate having a thickness of about 40 µm.

The first load beam 23 is made of, in this embodiment, a stainless steel plate having a thickness of about 100 µm, and supports the entire surface of the hinge 25. The fixing of the first load beam 23 with the hinge 25 is performed by pinpoint welding at a plurality of points.

The second load beam 24 is also made of, in this embodiment, a stainless steel plate having a thickness of about 100 µm, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA from the magnetic-disk surface during out of operation is prepared.

The base plate 27 to be attached to the drive arm 16 shown in FIG. 1 is made of, in this embodiment, a stainless steel or iron plate having a thickness of about 150 ?m. This base plate 27 is fixed to the attaching section 23a of the first load beam 23 by welding.

On the flexure 26, a flexible conductor member 28 including a plurality of trace conductors of a thin-film multi-layered pattern are formed or disposed. The conductor member 28 is formed by a known method similar to the patterning method of forming a printed circuit board on a thin metal plate such as a flexible printed circuit (FPC). For example, the conductor member 28 is formed by sequentially depositing a first insulation material layer made of a resin such as polyimide with a thickness of about 5 µm, a patterned Cu layer (trace conductor layer) with a thickness of about 4 µm, and a second insulation material layer made of a resin, such as polyimide, having a thickness of about 5 µm on the flexure 26 in this order. Within the regions of the connection pads formed for connecting with the actuator, the magnetic head element and an external circuit, an Au layer is deposited on the Cu layer and there is no second insulation material layer on the Au layer.

In this embodiment, this conductor member 28 consists of a first conductor member 28a including two trace conductors connected to the magnetic head element for one side, thus four trace conductors for both sides, and a second conductor member 28b including a trace conductor connected to the actuator 22 for one side, thus two trace conductors for both sides.

One end of the trace conductors of the first conductor member 28a is electrically connected to head element connection pads 29 formed on an individually separated and freely movable section 26c of the flexure 26. The connection pads 29 are ball-bonded to terminal electrodes 21a of the magnetic head slider 21 by Au bonding, wire bonding or stitch bonding. The other end of the trace conductors of the first conductor member 28a is electrically connected to external circuit connection pads 30 used for connection with an external circuit.

One end of trace conductors of the second conductor member 28b is electrically connected to actuator connection pads 31 formed on an insulation layer on the tongue 26a of the flexure 26. The connection pads 31 are connected to A channel and B channel signal terminals 22b and 22c formed on the base section 22a of the actuator 22, respectively. The other end of trace conductors of the second conductor member 28b is electrically connected to the external circuit connection pads 30.

A structure of the HGA according to the present invention is not limited to the aforementioned structure. Furthermore, although it is not shown, a head drive IC chip may be mounted on a middle of the suspension 20.

Figure 5:
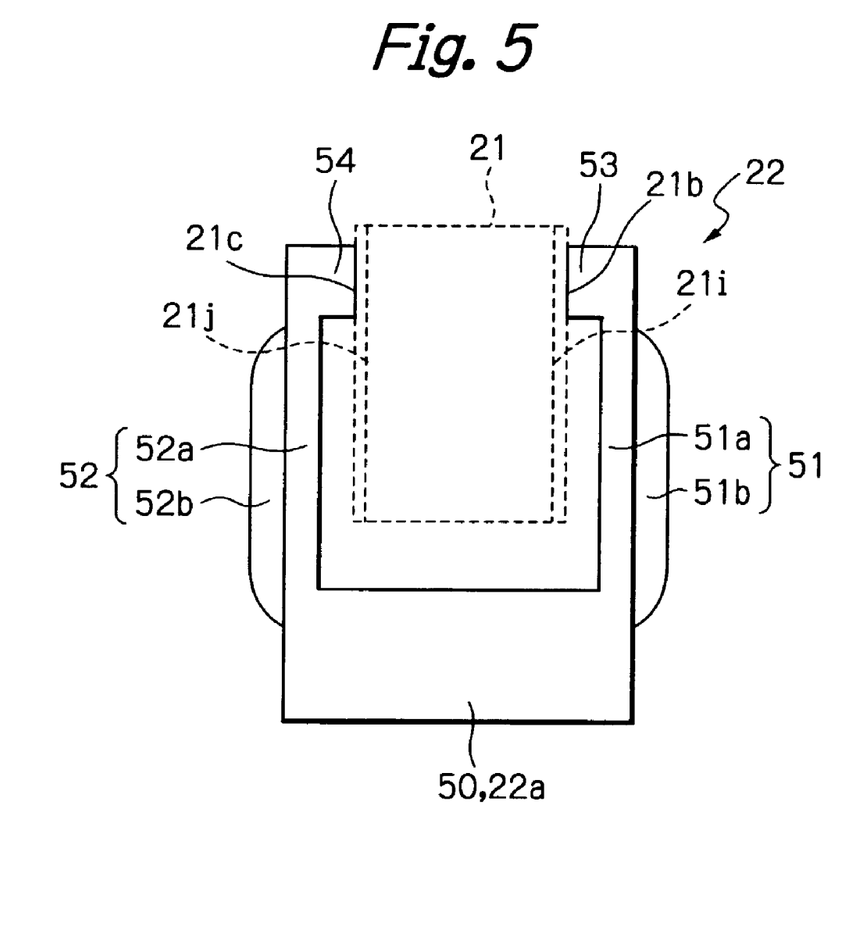
FIG. 5 is a plane view illustrating a structure of an actuator in the embodiment of FIG. 1.
Figure 6:
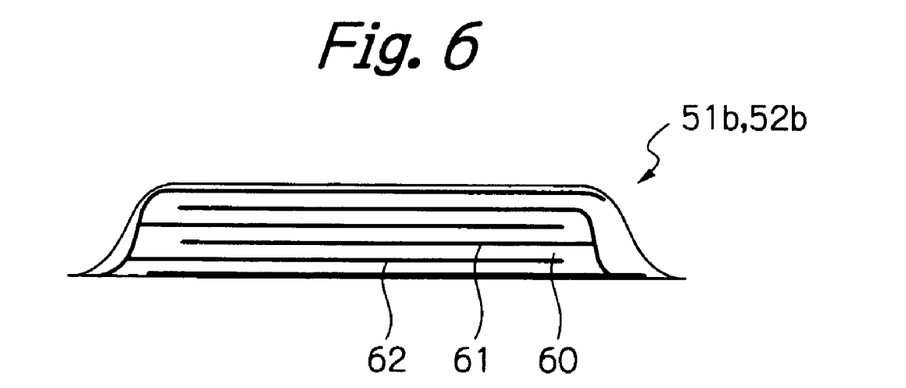
FIG. 6 is a sectional view illustrating a structure of a piezoelectric element section of the actuator shown in FIG. 5.
Figure 7:
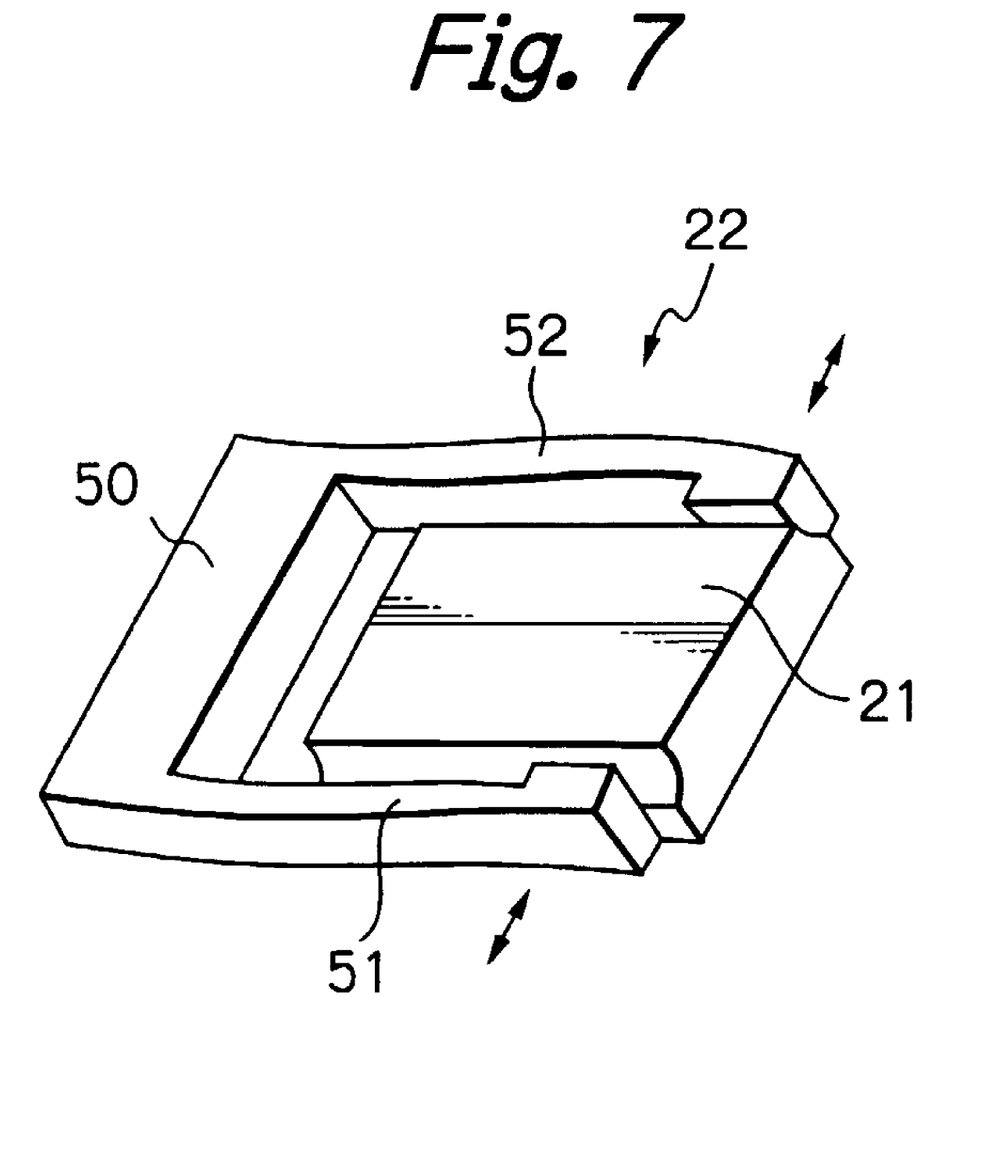
FIG. 7 is an oblique view illustrating an operation of the actuator shown in FIG. 5.

FIG. 5 illustrates a structure of the actuator 22 in the embodiment of FIG. 1, FIG. 6 illustrates a structure of a piezoelectric element section of the actuator 22, and FIG. 7 illustrates operations of this actuator 22.

As will be noted from FIG. 5, the actuator 22 has a rough U-plane shape and consists of a base section 50 (22a) to be fixed to a suspension and a pair of movable arms 51 and 52 perpendicularly extending from both side ends of the base section 50. At top end sections of the movable arms 51 and 52, formed respectively are slider fixing sections 53 and 54 to be fixed to side surfaces 21b and 21c of the magnetic head slider 21 so that the slider 21 is caught in a space between the slider fixing sections 53 and 54. The spacing between the slider fixing sections 53 and 54 is determined to a value substantially equal to or slightly less than the width of the magnetic head slider to be caught therein. A thickness of the actuator 22 is determined to a value equal to or less than that of the magnetic head slider to be held so that the total thickness of the HGA will not increase as a result of the mounting of the actuator. Conversely, by thickening the actuator 22 up to the thickness of the magnetic head slider to be held, the strength of the actuator itself can be increased without increasing the total thickness of the HGA.

The slider fixing sections 53 and 54 are projected inwardly, namely toward the magnetic head slider 21, so that only these sections 53 and 54 are attached to the side surfaces 21b and 21c of the magnetic head slider 21 and that there exists air gaps between the remaining sections of the movable arms 51 and 52 and the side surfaces of the magnetic head slider 21.

The movable arms 51 and 52 consist of arm members 51a and 52a and piezoelectric elements 51b and 52b formed on side surfaces of the arm members 51a and 52a, respectively.

The base section 50 and the arm members 51a and 52a of the actuator 22 are united by an elastic sintered ceramic such as ZrO2 for example. Because the main sections of the actuator are made of the elastic sintered ceramic such as ZrO2 that is strong for bending, a shock resistance of the actuator itself increases.

Each of the piezoelectric elements 51b and 52b has, as shown in FIG. 6, a multi-layered structure of alternately laminating piezoelectric material layers 60, signal electrode layers 61 and ground (common) electrode layers 62. By applying voltage across the signal electrode layers 61 and the ground (common) layers 62, the piezoelectric material layers 60 expand and contract. The piezoelectric material layer 60 is made of material that expands and contracts by reverse piezoelectric effect or by electrostrictive effect. The signal electrode layers 61 are electrically connected to the A channel signal terminal 22b or the B channel signal terminal 22c, and the ground (common) electrode layers 62 are electrically connected to ground (common) terminal 22d or 22e, shown in FIGS. 3 and 4.

In case that the layers 60 are made of piezoelectric material such as PZT (Lead Zirconate Titanate Oxidization), these piezoelectric material layers are in general polarized so as to improve their displacement performance. The polarized direction is the lamination direction of the piezoelectric material layers 60. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 51b and 52b, the piezoelectric element contracts or expands in response to the applied voltage polarity and thus the movable arms 51 and 52 bend to trace a S-character resulting the top end sections of the arms 51 and 52 to laterally and linearly displace as shown in FIG. 7. Thus, the magnetic head slider 21 fixed with the actuator 22 also laterally and linearly displaces. Because the slider displaces, namely, oscillates with linear motion not swinging or rotational motion, more precise positioning of the magnetic head element can be expected.

It is possible to apply voltages that induce mutually reverse motions may be simultaneously applied to the piezoelectric elements 51b and 52b, respectively. In other words, AC voltages may be simultaneously applied to the piezoelectric elements 51b and 52b so that one piezoelectric element expands when the other piezoelectric element contracts and vice versa. The oscillation of the movable arms is centered when no voltage is applied to the piezoelectric elements. In this case, the amplitude of the oscillation will be about twice of that when the AC voltages are applied.

However, one of the piezoelectric elements is expanded and therefore the direction of the driving voltage opposes that of the polarization in the piezoelectric material layer. Thus, if the applied voltage is high or the voltage is continuously applied, attenuation in polarization of the piezoelectric material layer may occur. It is desired, therefore, that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramic piezoelectric material such as PZT[Pb(Zr,Ti)O3], PT(PbTiO3), PLZT[(Pb,La)(Zr,Ti)O3], or barium titanate (BaTiO3).

Each of the piezoelectric elements may have a single layer structure of alternately laminating a piezoelectric material layer, a signal electrode layer and a ground (common) electrode layer.

As aforementioned, because the actuator 22 in this embodiment holds the side surfaces of the magnetic head slider 21 so that the slider 21 is caught in a space between the movable arms 51 and 52, the thickness of the HGA around the magnetic head slider does not increase even if the actuator 22 is attached. Thus, no modifications in size of the magnetic disk drive apparatus resulting from the mounting of the actuator is necessary. Also, because the actuator 22 and the magnetic head slider 21 are not stacked to form a cantilever structure, a shock resistance can be greatly improved. Furthermore, because the magnetic head slider 21 is caught in between the movable arms 51 and 52, the top end sections of the movable arms 51 and 52, which actually transfer the displacement to the slider 21, can be always positioned at the top end of the slider 21. Thus, it is possible to provide a constant travel to the slider even if the size of the magnetic head slider 21 changes, and therefore an adequate stroke of the magnetic head at the precise positioning operation can always be obtained.

According to the present invention, the magnetic head slider 21 is designed to have at least one recess at each of the side surfaces 21b and 21c, for receiving an adhesive used to adhere the magnetic head slider to the actuator 22. Hereinafter, the configuration or shape of the slider 21 will be described in detail.

Figure 8:
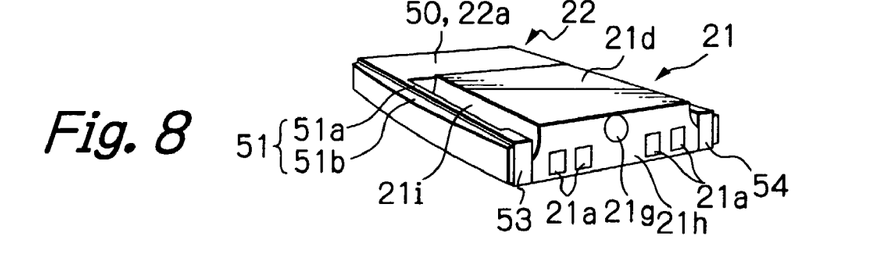
FIG. 8 is an oblique view illustrating the actuator and a magnetic head slider adhered to the actuator in the embodiment of FIG. 1.
Figure 9:
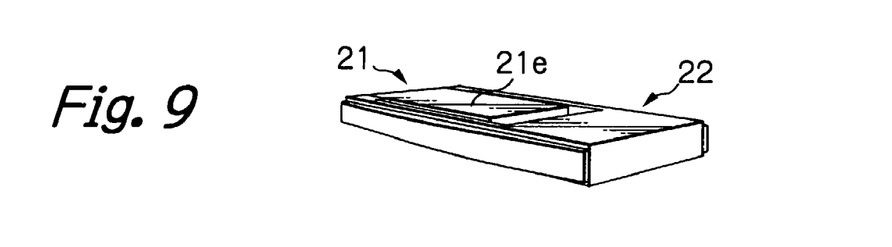
FIG. 9 is an oblique view illustrating the actuator and a magnetic head slider adhered to the actuator in the embodiment of FIG. 1, seen from a different direction from FIG. 8.
Figure 10:
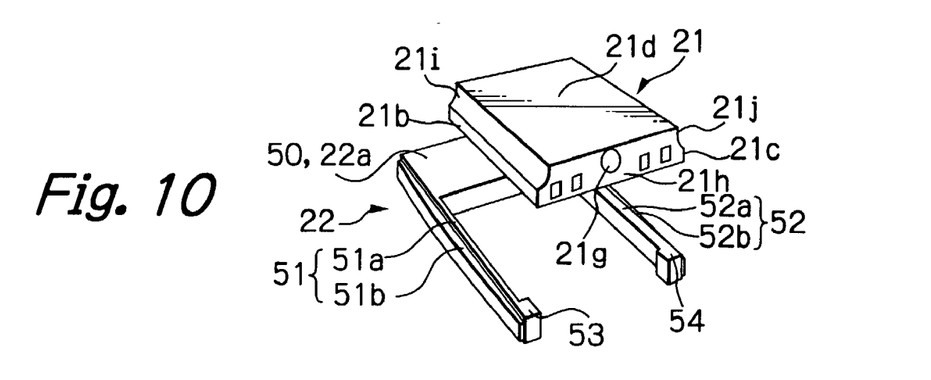
FIG. 10 is an explode oblique view illustrating the actuator and a magnetic head slider adhered to the actuator in the embodiment of FIG. 1.
Figure 11:
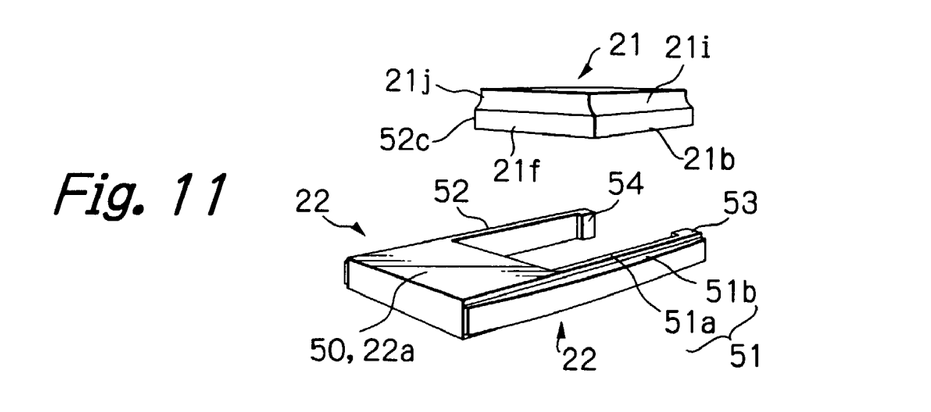
FIG. 11 is an exploded oblique view illustrating the actuator and a magnetic head slider adhered to the actuator in the embodiment of FIG. 1, seen from a different direction from FIG. 10.
Figure 12:
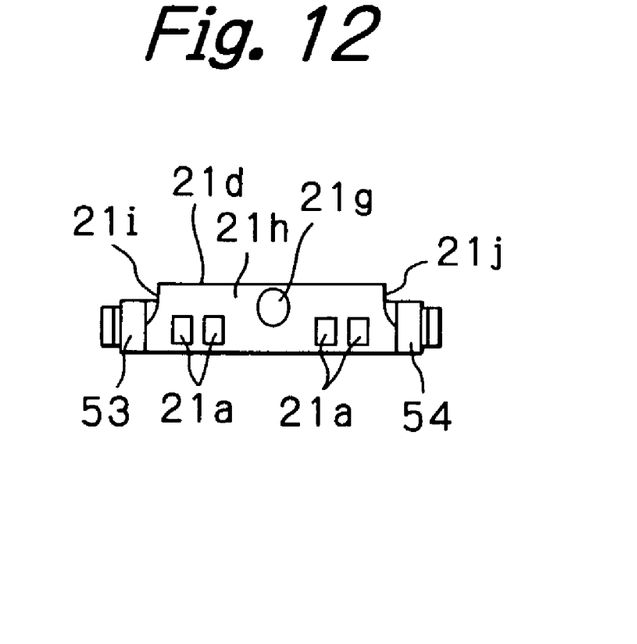
FIG. 12 is an elevation view illustrating the actuator and a magnetic head slider adhered to the actuator in the embodiment of FIG. 1, seen from an element-formed surface of a magnetic head slider.
Figure 13:
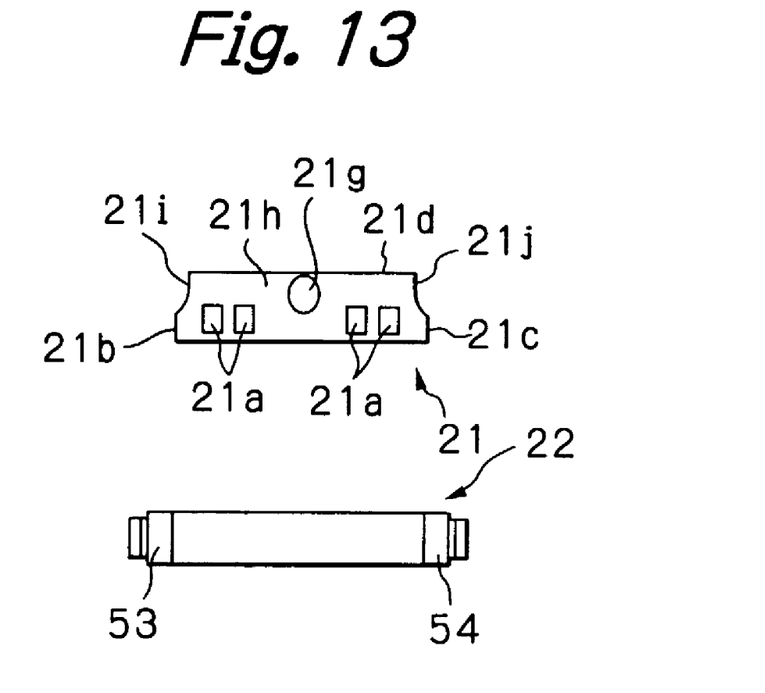
FIG. 13 is an exploded elevation view illustrating the actuator and a magnetic head slider adhered to the actuator in the embodiment of FIG. 1, seen from the element-formed surface of the magnetic head slider.

FIGS. 8 and 9 illustrate the actuator 22 and a magnetic head slider 21 adhered to the actuator 22 in this embodiment, seen from different directions with each other, FIGS. 10 and 11 illustrate the actuator 22 and the magnetic head slider 21 in this embodiment, seen from different directions with each other, and FIGS. 12 and 13 illustrate the actuator 22 and the magnetic head slider 21 adhered to the actuator 22 in this embodiment, seen from an element-formed surface of the magnetic head slider.

As will be noted from these figures and FIGS. 1–5 and 7, the magnetic head slider 21 has a substantially rectangular parallelepiped shape with an ABS 21d, a surface 21e opposite to the ABS, the side surfaces 21b and 21c, a top end surface 21f and a rear end surface or an element-formed surface 21h on which the thin-film magnetic head element 21g and the terminal electrodes 21a are formed. Particularly, in this embodiment, the magnetic head slider 21 has grooves 21i and 21j formed at ABS side edges of the side surfaces 21b and 21c along their entire lengths, respectively. These grooves 21i and 21j receive an adhesive used to adhere the magnetic head slider 21 to the slider fixing sections 53 and 54 of the actuator 22. The presence of grooves 21i and 21j at the side surfaces 21b and 21c provide the following various advantages.

Figure 14A:
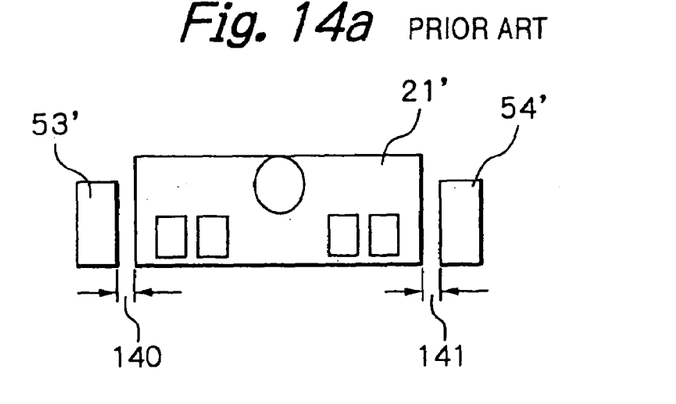
FIGS. 14a and 14b are views illustrating how an actuator and a conventional magnetic head slider with no groove for receiving an adhesive are adhered.
Figure 14B:
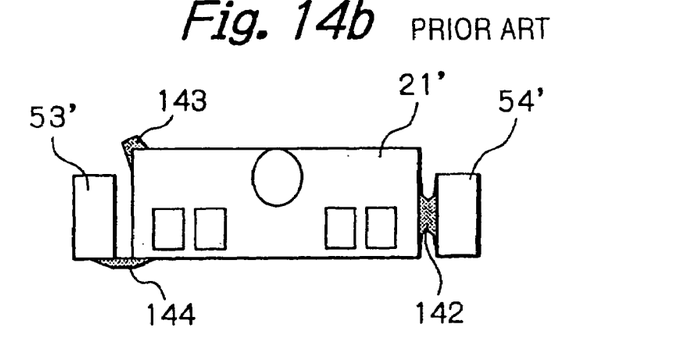
Figure 15:
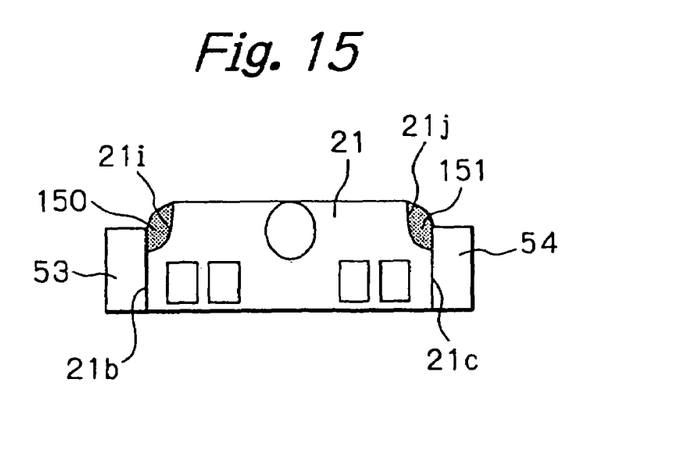
FIG. 15 is a view illustrating how the actuator and the magnetic head slider in the embodiment of FIG. 1 are adhered.

FIGS. 14a and 14b illustrate how an actuator and a conventional magnetic head slider 21' with no groove for receiving an adhesive are adhered, and FIG. 15 illustrates how the actuator 22 and the magnetic head slider 21 in this embodiment are adhered.

As shown in FIG. 14a, when the conventional magnetic head slider 21' is adhered to the actuator, it is necessary that a space between the slider fixing sections 53' and 54' of the actuator is a sufficiently larger than the width of the slider 21'. Therefore, it is very difficult to control that right and left gaps 140 and 141 between side surfaces of the magnetic head slider 21' and the slider fixing sections 53' and 54' of the actuator become equal to each other. Also, a layer of the adhesive may become too thick causing a deterioration in a resonance characteristics and a decrease in stroke. Furthermore, as shown in FIG. 14b, because a restriction 142 of the adhesive may be formed at the middle of each adhering surface, an adhesive strength will be reduced, a resonance frequency will be lowered and the stroke will be reduced. In addition, if an adhesive with a high viscosity is used, the adhesive will not be sufficiently entered between side surfaces of the magnetic head slider and the slider fixing sections of the actuator and therefore a sufficient strength in adhering cannot be obtained. Also, as shown in FIG. 14b, because the actuator and the magnetic head slider 21' are assembled after an adhesive is coated, the adhesive may squeeze out and thus an adhesive deposition 143 to an ABS of the magnetic head slider and an adhesive deposition 144 to the bottom surfaces of the actuator and the slider may occur. Therefore, it is difficult to control an amount of the adhesive used. As a result of these problems, variations in adhering strength, in resonance frequency and in stroke characteristics may occur during mass production.

Contrary to this, according to this embodiment, as shown in FIG. 15, because the magnetic head slider 21 has the grooves 21i and 21j for receiving adhesives 150 and 151, formed at its respective side surfaces 21b and 21c, the adhesives will be entered to the adhering parts between the actuator 22 and the magnetic head slider 21 with reliability and therefore a stable and sufficient adhering strength can be obtained. Also, because the adhesive will not squeeze out, an amount of the adhesive used can be precisely controlled thereby preventing variations in adhering strength, in resonance frequency and in stroke characteristics from occurring during mass production. Furthermore, because a space between the slider fixing sections 53 and 54 of the actuator 22 for catching the magnetic head slider 21 can be determined to a small value equal to or slightly greater than the width of the slider 21, there exists no thick layer of the adhesive and it is possible to minimize a difference between the right and left gaps at the adhering parts. Therefore, resonance characteristics and stroke characteristics can be prevented from being deteriorated. In addition, because it is possible to apply an adhesive after assembling the magnetic head slider 21 with the actuator 22, the adhering process becomes very easy.

In the aforementioned embodiment, the grooves 21i and 21j are formed at the ABS-side edges of the side surfaces 21b and 21c along their entire lengths. However, in modifications, these grooves may be formed along only a partial length of each of the ABS-side edges corresponding to the adhering parts, namely corresponding to the slider fixing sections 53 and 54 of the actuator 22. In modifications, also, a recess with another shape may be formed instead of the groove. Furthermore, a plurality of grooves or recesses may be formed at each ABS-side edge of the magnetic head slider.

FIGS. 16a–16f illustrate parts of a manufacturing process of the magnetic head slider in this embodiment.

Figure 16A:
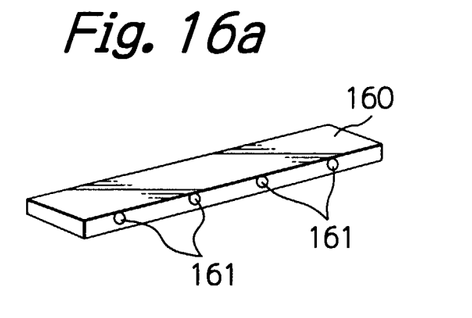
FIGS. 16a to 16f are views illustrating a part of a manufacturing process of the magnetic head slider in the embodiment of FIG. 1.

First, a plurality of bars are obtained by dicing an wafer on which many of magnetic head elements have been formed in matrix by a thin-film fabrication method. As shown in FIG. 16a, each bar 160 has a plurality of continuously aligned magnetic head sliders with the magnetic head elements 161.

Figure 16B:
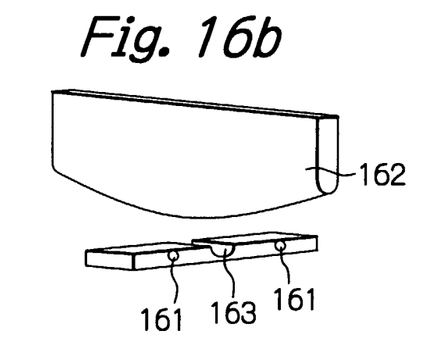

Then, as shown in FIG. 16b, by means of a grinding wheel 162, a first grooving work of the bar 160 from the ABS side is performed.

Figure 16C:
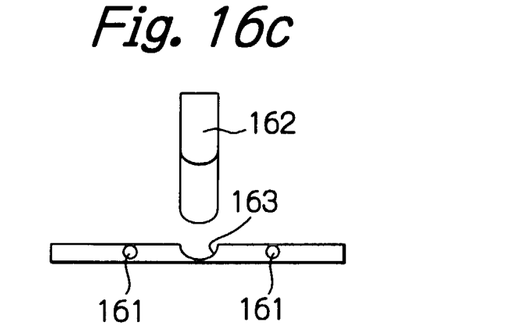

This first grooving work should be completed before the grinding wheel 162 comes through the bar 160 as shown in FIG. 16c. Thus, blind grooves 163 each having a concave contour corresponding to a shape of a blade edge of the grinding wheel 162 are formed.

Figure 16D:
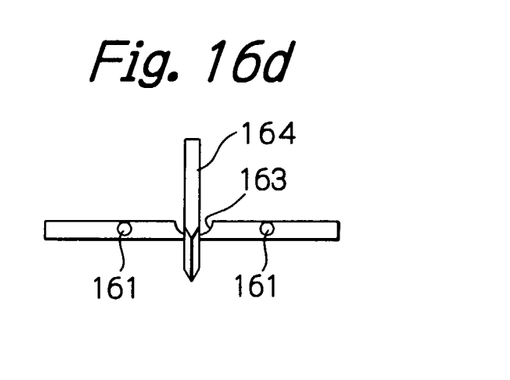

Thereafter, as shown in FIG. 16d, a second grinding work for grooving the center of each blind groove 163 is executed to dice the bar 160 by means of a grinding wheel 164 with a width narrower than that of the blind groove 163. Thus, as shown in FIGS. 16e and 16f, individually separated magnetic head sliders 165 are obtained.

Figure 16E:
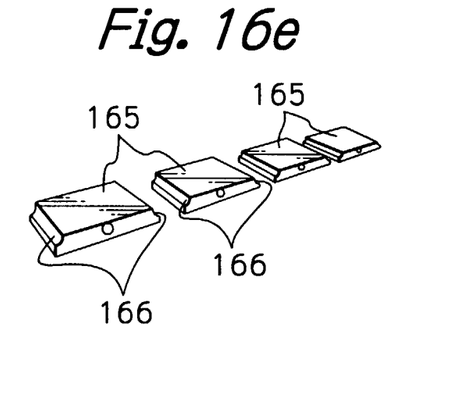
Figure 16F:
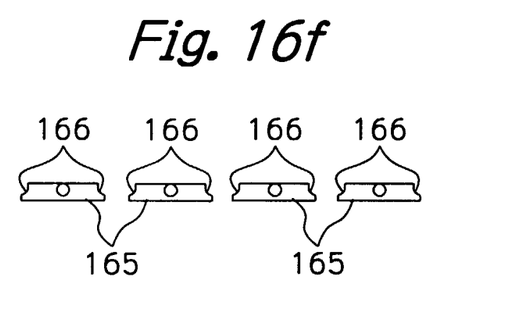

As will be seen from FIGS. 16e and 16f, each magnetic head slider 165 has grooves 166 at the ABS-side edges of the both side surfaces along the whole length of the ABS-side edges.

As aforementioned, according to this embodiment, the grooves 166 for receiving an adhesive can be made only by forming the blind grooves 163 on the bar 160. Thus, it is not necessary to change a bar jig for dicing the bar 160 to a new one for making the grooves. Therefore, the conventional manufacturing process can be substantially used, and the manufacturing process of the magnetic head slider can be prevented from complicating.

Figure 17:
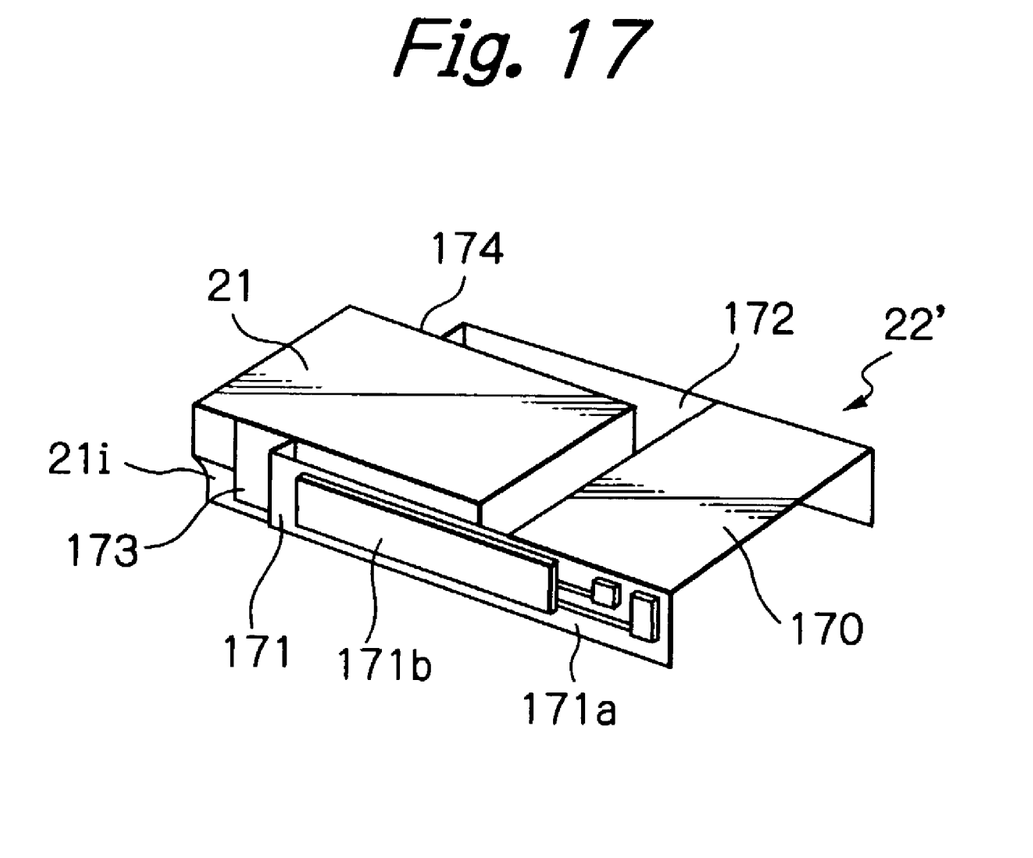
FIG. 17 is an oblique view illustrating an actuator and a magnetic head slider adhered to the actuator in another embodiment according to the present invention.

FIG. 17 illustrates an actuator and a magnetic head slider adhered to the actuator in another embodiment according to the present invention.

In this embodiment, a configuration of the magnetic head slider 21 is the same as that in the embodiment of FIG. 1.

However, in this embodiment, a main section of an actuator 22' is formed by cutting a metal plate into individual actuator members each having a rough U-plane shape and by bending each of them in a three-dimensional shape. Namely, the actuator member is bent at both side ends of its plane base section 170 toward almost perpendicular direction. A pair of movable arms 171 and 172 that are kept in almost perpendicular to the base section 170 extend frontward from these bent areas. The upper surface, in the figure, of the base section 170 is fixed to the suspension. The movable arms 171 and 172 are formed in a plane shape parallel to the side surfaces of the magnetic head slider 21.

At top end sections of the movable arms 171 and 172, formed respectively are slider fixing sections 173 and 174 to be fixed to the side surfaces of the magnetic head slider 21 by bending the arms inwardly in a crank arm shape. The spacing between the slider fixing sections 173 and 174 is determined to a value substantially equal to or slightly larger than the width of the magnetic head slider to be caught therein. The slider fixing sections 173 and 174 are bent inwardly to project toward the side surfaces of the magnetic head slider 21, so that only these sections 173 and 174 are attached to the side surfaces of the magnetic head slider 21 and that there exists air gaps between the remaining sections of the movable arms 171 and 172 and the side surfaces of the magnetic head slider 21.

The movable arms 171 and 172 consist of arm members (171*a*) and piezoelectric elements (171*b*) formed on side surfaces of the arm members, respectively.

The base section 170 and the arm members of the actuator 22' are united and formed by bending an elastic single metal plate such as a stainless steel plate, for example. Because the main section of the actuator consists of the metal plate, a weight of the actuator decreases and also a shock resistance of the actuator itself increases. Instead of a steel alloy spring plate, such as the stainless steel plate, a resilient plate spring member, for example, a carbon steel spring plate, a copper alloy spring plate such as copper titanium plate, a phosphor bronze plate or a beryllium copper plate, or a titanium plate may be used. In case that the piezoelectric elements are formed by printing and sintering, it is necessary to use a high heat resistance metal plate.

As aforementioned, because the main section of the actuator 22' in this embodiment is made from a metal plate, the weight of the entire actuator can be reduced and, thus, a mechanical resonance frequency of the actuator can be increased. Also, because the basic member is formed by the metal plate that is strong and light-weighted, a shock resistance of the movable arms 171 and 172 which are particularly susceptible to shock can be greatly improved. As a result of the usage of the metal plate provided with a high mechanical strength, treatment of the actuator during assembling of the HGA becomes very easy.

By using the metal plate to form the main section of the actuator, the flexibility on a design of the actuator will improve with the shape and/or size. Thus, not only it is enabled to design the actuator with a sufficient stroke, but also it is possible to align the center of the magnetic head slider 21 and the load point or dimple position with the center of the actuator 22' resulting in the flying performance of the magnetic head slider 21 to be extremely stabilized. Because the metal plate can be precisely machined, accuracy in size of the actuator 22' itself can be greatly improved.

Furthermore, because the actuator 22' in this embodiment holds the side surfaces of the magnetic head slider 21 so that the slider 21 is caught in a space between the movable arms 171 and 172, the thickness of the HGA around the magnetic head slider does not increase even if the actuator 22' is attached. Thus, no modifications in size of the magnetic disk drive apparatus resulting from the mounting of the actuator is necessary.

In addition, because the actuator 22' and the magnetic head slider 21 are not stacked to form a cantilever structure, a shock resistance can be greatly improved.

Further, because the magnetic head slider 21 is caught in between the movable arms 171 and 172, the top end sections of the movable arms 171 and 172, which actually transfer the displacement to the slider 21, can be extended to always position at the top end of the slider 21. Thus, it is possible to provide a constant travel to the slider even if the size of the magnetic head slider 21 changes, and therefore an adequate stroke of the magnetic head at the precise positioning operation can be always obtained.

Other configurations such as forming of grooves for receiving an adhesive on the magnetic head slider 21, operations, advantages and modifications in this embodiment are the same as those in the embodiments of FIG. 1. Also, in FIG. 17 of this embodiment, elements similar to those in the embodiment of FIG. 1 are represented by the same reference numerals.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head slider comprising:
at least one head element;
two side surfaces to be fixed to two arms of an actuator for precisely positioning said at least one head element;
an air bearing surface; and
grooves for receiving an adhesive, formed separately from said air bearing surface, each of said grooves being formed at an edge between each of said two side surfaces near said air bearing surface,
wherein each of said grooves has a smoothly-curved concave contour.

2. The head slider as claimed in claim 1, wherein said grooves are formed along said air bearing surface.

3. The head slider as claimed in claim 1, wherein each of said grooves is formed at an edge between each of said two side surfaces and said air bearing surface.

4. The head slider as claimed in claim 1, wherein said groove is formed along an entire length of said edge.

5. The head slider as claimed in claim 1, wherein said at least one head element is at least one thin-film magnetic head element.

6. A head gimbal assembly including a head slider, a support member and a precise positioning actuator provided with two arms for precisely positioning at least one head element, said head slider comprising:
at least one head element;
two side surfaces fixed to said two arms of said actuator;
an air bearing surface; and grooves for receiving an adhesive, formed separately from said air bearing surface, each of said grooves being formed at an edge between each of said two side surfaces and said air bearing surface, wherein each of said grooves has a smoothly-curved concave contour.

7. The head gimbal assembly as claimed in claim 6, wherein said grooves are formed along said air bearing surface.

8. The head gimbal assembly as claimed in claim 6, wherein each of said grooves is formed at an edge between each of said two side surfaces and said air bearing surface.

9. The head gimbal assembly as claimed in claim 6, wherein said groove is formed along an entire length of said edge.

10. The head gimbal assembly as claimed in claim 6, wherein said at least one head element is at least one thin-film magnetic head element.

11. The head gimbal assembly as claimed in claim 6, wherein said two arms comprise a pair of movable arms, and wherein said two side surfaces are caught and supported by said pair of movable arms of said actuator.

12. The head gimbal assembly as claimed in claim 11, wherein a space between said pair of movable arms of said actuator is substantially equal to or slightly greater than a distance between said two side surfaces of said head slider.

13. The head gimbal assembly as claimed in claim 11, wherein said actuator further comprises a base section, said pair of movable arms extending forward from said base section, and wherein top end sections of said pair of movable arms are capable of displacing in response to a drive signal applied to said actuator along an air bearing surface of said head slider.

14. The head gimbal assembly as claimed in claim 13, wherein said pair of movable arms and said base section of said actuator are made of an elastic sintered ceramic.

15. The head gimbal assembly as claimed in claim 13, wherein said pair of movable arms and said base section of said actuator are made of a metal plate member.

16. The head gimbal assembly as claimed in claim 11, wherein each of said pair of movable arms comprises an arm member, and a piezoelectric element formed or adhered on a side surface of said arm member.

17. A method for adhering a head slider provided with at least one head element to an actuator for precisely positioning said at least one head element, said method comprising the steps of:

catching two side surfaces of said head slider between a pair of movable arms of said actuator; and providing an adhesive into a plurality of grooves of said head slider, said grooves being formed separately from an air bearing surface of said head slider, each of said grooves being formed at an edge between each of said side surfaces and said air bearing surface of said head slider, wherein each of said grooves has a smoothly-curved concave contour.

18. A manufacturing method of a head gimbal assembly comprising the steps of:

forming a head slider provided with at least one head element, two side surfaces, an air bearing surface and a plurality of grooves for receiving an adhesive, formed separately from said air bearing surface, each of said grooves being formed at an edge between each of said two side surfaces and said air bearing surface;

forming an actuator for precisely positioning said at least one head element, said actuator being provided with a base section and a pair of movable arms extending from said base section, said pair of movable arms being capable of displacing in response to a drive signal applied to said actuator;

catching said two side surfaces of said head slider between said pair of movable arms of said actuator;

providing an adhesive into said plurality of grooves so as to adhere said side surfaces to said movable arms, respectively; and fixing said base section of said actuator to a support member, wherein each of said grooves has a smoothly-curved concave contour.

19. The method as claimed in claim 18, wherein said groove is formed along an entire length of said edge.

20. The method as claimed in claim 18, wherein a space between said pair of movable arms of said actuator is substantially equal to or slightly greater than a distance between said side surfaces of said head slider.

* * * * *